H. H. DICKINSON.
Lamp Burner.
No. 33,879. Patented Dec. 10, 1861.
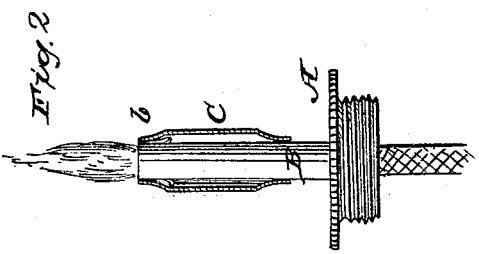
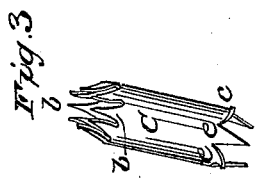
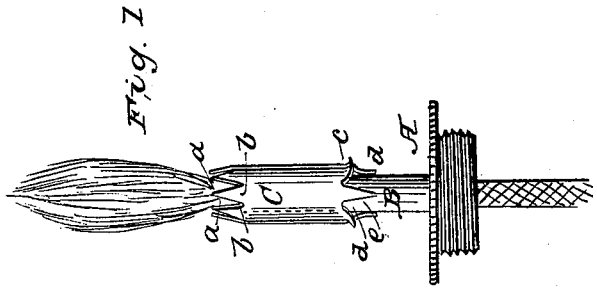
Witnesses
JW Coombs
James Laird
Inventor
H. H. Dickinson
per Munn & Co
Attorneys

UNITED STATES PATENT OFFICE.

H. H. DICKINSON, OF HARTFORD, CONNECTICUT.

ATTACHMENT FOR KEROSENE-LAMPS.

Specification forming part of Letters Patent No. 33,879, dated December 10, 1861.

*To all whom it may concern:*

Be it known that I, H. H. DICKINSON, of Hartford, in the county of Hartford and State of Connecticut, have invented a new and Improved Attachment for Lamps for Burning Kerosene, Coal-Oil, and other Carbonaceous Fluids; and I do hereby declare the following to be a full, clear, and exact description of the same, reference being had to the accompanying drawings, making a part of this specification, in which—

Figure 1 represents a lamp-top with attachment in position for use. Fig. 2 represents a similar view of a lamp-top with the attachment slid down on the wick-tube and shown in section. Fig. 3 represents the attachment by a perspective view detached from the wick-tube.

Similar letters of reference indicate corresponding parts in the several figures.

The object of this invention is to obtain a simple and economical device which can be applied to any lamp having a round wick-tube to adapt it for burning coal-oil, kerosene, and other carbonaceous fluids without a chimney; and the invention consists in a thimble attachment to the wick-tube of a lamp adapted to deliver a current of heated air to the flame, as will be hereinafter fully explained.

To enable others skilled in the art to fully understand and construct my invention, I will proceed to describe it.

A represents a screw cap or top, and B the wick-tube, of an ordinary fluid-lamp. Fitted upon and surrounding this tube is another tube or thimble C, which is of somewhat larger diameter than the wick-tube to allow a free circulation of air through it from the bottom upward to feed the flame. The upper portion of the thimble for about one-fourth (more or less) of its entire length is of conical form and slitted from the top down to the base at equal distances apart around the thimble, forming alternate interstices $a$ and points $b$, the latter of which $b$, when the thimble is in use, is placed so as to just enter the external edge of the flame at its base, as shown clearly in Fig. 1, while the former $a$ delivers the air passing through the thimble to the flame. The thimble at the bottom for about one-fourth (more or less) of its entire length is slitted similar to the top and the teeth bent alternately out, and in the former C to nearly a horizontal position to serve as a handle to adjust the thimble up and down on the wick-tube, and to form openings $d$ to admit air into the thimble and the latter C inward, so as to embrace the wick-tube to keep the thimble centrally thereof and to retain it in any position on the tube up and down in which it may be placed, allowing the air to circulate freely through the interstices thereof, and as it becomes rarefied in passing between the surfaces of the thimble and wick-tube, which become heated by the flame to ascend, and by mixing with the inflammable gases to assist in supporting and effecting a perfect combustion.

The within-described lamp attachment is adapted to any kind of lamp having a round wick-tube, is very simple in its construction, perfectly efficient, and can be furnished at a small cost.

I do not claim, broadly, the idea of conveying heated air to the flame of a lamp for the purpose of aiding combustion; but,

Having thus described my invention, what I do claim as new, and desire to secure by Letters Patent, is—

The adjustable tube or thimble C, surrounding the round wick-tube of an ordinary lamp, said thimble being of conical form at top and having points $b\ e$ and interstices $a\ d$ at top and bottom, operating in the manner described, for the purpose set forth.

H. H. DICKINSON.

Witnesses;
 WM. I. PIERCE,
 WM. ROGERS, Jr.